United States Patent
Chuang et al.

(10) Patent No.: US 9,321,680 B2
(45) Date of Patent: Apr. 26, 2016

(54) HIGH-SPEED MICRO-HOLE FABRICATION IN GLASS

(75) Inventors: Ta-Ko Chuang, Painted Post, NY (US); Daniel Ralph Harvey, Bath, NY (US); Alexander Mikhailovich Streltsov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 34 days.

(21) Appl. No.: 14/122,807

(22) PCT Filed: May 30, 2012

(86) PCT No.: PCT/US2012/039911
§ 371 (c)(1),
(2), (4) Date: Nov. 27, 2013

(87) PCT Pub. No.: WO2012/166753
PCT Pub. Date: Dec. 6, 2012

(65) Prior Publication Data
US 2014/0116091 A1    May 1, 2014

Related U.S. Application Data

(60) Provisional application No. 61/491,538, filed on May 31, 2011.

(51) Int. Cl.
*C03B 21/06* (2006.01)
*C03C 23/00* (2006.01)
(Continued)

(52) U.S. Cl.
CPC ............... *C03C 23/002* (2013.01); *C03C 15/00* (2013.01); *C03C 23/0025* (2013.01); *G02B 6/136* (2013.01); *G02B 2006/1213* (2013.01)

(58) Field of Classification Search
CPC .... C03C 15/00; B23K 26/365; B23K 26/381; B23K 26/38; B23K 26/383; B23K 26/385; B23K 26/4075
See application file for complete search history.

(56) References Cited

U.S. PATENT DOCUMENTS 5,314,522 A * 5/1994 Kondo et al. ............... 65/31
5,374,291 A * 12/1994 Yabe et al. ............... 65/30.11
(Continued)

OTHER PUBLICATIONS

Patent Cooperation Treaty International Notification of Transmittal of the International Preliminary Report of Patentability Report on Patentability (Chapter I of the Patent Cooperation Treaty) of the International Searching Authority, international application No. PCT/US2012/039911: mailing date Dec. 12, 2013, 7 pages.
(Continued)

*Primary Examiner* — Jason L Lazorcik
(74) *Attorney, Agent, or Firm* — John T. Haran

(57) ABSTRACT

A method for fabricating a high-density array of holes in glass comprises providing a glass sheet having a front surface and irradiating the glass sheet with a laser beam so as to produce open holes extending into the glass sheet from the front surface of the glass sheet. The beam creates thermally induced residual stress within the glass around the holes, and after irradiating, the glass sheet is annealed to eliminate or reduce thermal stress caused by the step of irradiating. The glass sheet is then etched to produce the final hole size. Preferably, the glass sheet is also annealed before the step of irradiating, at sufficiently high temperature for a sufficient time to render the glass sheet dimensionally stable during the step of annealing after irradiating.

15 Claims, 3 Drawing Sheets

(51) Int. Cl.
  *C03C 15/00* (2006.01)
  *G02B 6/136* (2006.01)
  *G02B 6/12* (2006.01)

(56) References Cited

U.S. PATENT DOCUMENTS

| | | | | |
|---|---|---|---|---|
| 5,575,936 | A * | 11/1996 | Goldfarb | 219/121.68 |
| 5,844,200 | A * | 12/1998 | Leader et al. | 219/121.71 |
| 5,879,424 | A * | 3/1999 | Nishii et al. | 65/31 |
| 5,919,607 | A * | 7/1999 | Lawandy | 430/326 |
| 6,391,213 | B1 * | 5/2002 | Homola | 216/22 |
| 6,399,914 | B1 * | 6/2002 | Troitski | 219/121.69 |
| 8,980,727 | B1 * | 3/2015 | Lei et al. | 438/462 |
| 8,999,179 | B2 * | 4/2015 | Yu et al. | 216/18 |
| 2001/0009250 | A1 * | 7/2001 | Herman et al. | 219/121.69 |
| 2002/0041946 | A1 * | 4/2002 | Abe | 428/64.2 |
| 2003/0007772 | A1 * | 1/2003 | Borrelli et al. | 385/137 |
| 2003/0150839 | A1 * | 8/2003 | Kobayashi et al. | 216/97 |
| 2004/0092105 | A1 * | 5/2004 | Lee et al. | 438/689 |
| 2006/0219676 | A1 * | 10/2006 | Taylor et al. | 219/121.69 |
| 2008/0245109 | A1 * | 10/2008 | Flemming et al. | 65/387 |
| 2009/0013724 | A1 * | 1/2009 | Koyo et al. | 65/31 |
| 2010/0050692 | A1 * | 3/2010 | Logunov et al. | 65/31 |
| 2011/0195360 | A1 * | 8/2011 | Flemming et al. | 430/314 |
| 2012/0131958 | A1 * | 5/2012 | Shimoi et al. | 65/31 |
| 2013/0209731 | A1 * | 8/2013 | Nattermann et al. | 428/131 |
| 2013/0210245 | A1 * | 8/2013 | Jackl | 439/64 |
| 2013/0247615 | A1 * | 9/2013 | Boek et al. | 65/29.1 |
| 2014/0199519 | A1 * | 7/2014 | Schillinger et al. | 428/155 |
| 2015/0060402 | A1 * | 3/2015 | Burkett et al. | 216/41 |

OTHER PUBLICATIONS

Patent Cooperation Treaty International Notification of Transmittal of the International Search Report and The Written Opinion of the International Searching Authority, international application No. PCT/US2012/039911: mailing date May 30, 2012, 10 pages.

* cited by examiner

HIGH-SPEED MICRO-HOLE FABRICATION IN GLASS

CROSS-REFERENCE TO RELATED APPLICATIONS

This application claims the benefit of priority under 35 U.S.C. §371 of International Application Serial No. PCT/US12/39911, filed on May 30, 2012, which, in turn, claims the benefit of priority of U.S. Provisional Patent Application Ser. No. 61/491,538, filed on May 31, 2011, the contents of which are relied upon and incorporated herein by reference in their entireties as if fully set forth below.

RELATED APPLICATIONS

U.S. Patent application 61/418,152, filed 30 Nov. 2010 and assigned to the present Applicant, is related to the present application, but priority is not claimed thereto.

FIELD

The present disclosure relates to methods of fabricating high-density arrays of holes in glass, particularly high-density arrays of through-holes, and also particularly high-density arrays of high aspect ratio holes.

BACKGROUND AND SUMMARY

According to US Patent Publication No. 2003/0150839, tapered (conical) holes 120-130 μm in diameter may be made by laser ablation followed by acid etching to remove surface defects and chips. The disclosed process requires an ion-exchange step before laser irradiation. Irradiation conditions beyond laser spot size and fluence are not disclosed.

US Patent Publication 2009/0013724 describes hole formation by laser irradiation and acid etching in glasses of various compositions. Lasers with wavelengths 355 nm and 266 nm were used. The recommended (numerical) beam aperture is NA<0.07 and the focus is disclosed as either within the glass or behind the back surface. Hole profile and placement accuracy are not specifically addressed.

A previously demonstrated process for making such dense arrays of holes in glass is disclosed in U.S. Application Ser. No. 61/418,152 filed Nov. 30, 2010, assigned to the present Applicant. The disclosed method involves glass exposure with a nanosecond laser with pulse frequencies in the from 5 to 50 kHz, in particular in the range of from 10 to 20 kHz. Holes with aspect ratio of up to 20:1 or more in glass of about 500 to 600 micrometer thickness can be formed in 80 to 100 milliseconds. The disclosed method reliably provides high quality holes. What is desirable is a relatively low-cost and reliable process for forming relatively small holes at relatively tight minimum pitch, with good positioning accuracy and reasonably small variation in diameter throughout the depth, with less laser exposure time than 80-100 milliseconds per hole.

According to the present disclosure, a method is provided for fabricating a high-density array of holes in glass at higher speeds than the previously described method. The improved method comprises providing a glass sheet having a front surface and irradiating the glass sheet with a laser beam so as to produce open holes extending into the glass sheet from the front surface of the glass sheet. The beam creates thermally induced residual stress within the glass around the holes—increasingly so as the pulse rate (and to some degree, power) of the beam is increased so as to increase hole drilling speed. After irradiating, the glass sheet is annealed to eliminate or reduce thermal stress caused by the step of irradiating, then the glass sheet is etched to produce the final hole size. Preferably, the glass sheet is also annealed before the step of irradiating, at sufficiently high temperature for a sufficient time to render the glass sheet dimensionally stable during the step of annealing after irradiating.

Variations of the method of the present disclosure are described in the text below and with reference to the figures, described in brief immediately below.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Using the methods of the present disclosure, holes of 200 μm or less diameter on a minimum pitch of not more than 300 μm, with variation in diameter limited to 10 μm or less, desirably 5 μm or less, and with placement (hole center) positional variation limited to 8 μm or less, desirably 4 μm or less, are formed in a piece of glass, particularly in a thin sheet of glass, desirably less than 0.8 mm thick, preferably in the range of 0.5 to 0.63 mm thick or in the range of 0.2 to 0.4 mm thick. The thinnest or "waist" diameter is not less than 70% of the diameter of the opening at the surface, desirably not less than 80%. This performance level in hole formation was achieved previously by the present inventors and/or their associates using a laser repletion rate of typically about 15 kHz and average power about 1.5 W. What has now further been achieved by means of the methods of the present disclosure is a ten-fold reduction of the exposure time, for example, in 0.63 mm thick EagleXG® glass from Corning, from 90-100 milliseconds to 8-12 milliseconds, while still producing holes having good quality, such as holes meeting the above requirements. In contrast to the prior work, in this new process the laser pulse repetition rate is typically in the range of 80-150 kHz repetition rate; the mean power is typically 7-10 W. The new process works well with thinner glass sheets also, with corresponding reductions in exposure time.

Figure 4:
FIGS. 4, 5 and 6 are digital photographs of a comparative example of perspective, front side, and exit side views, respectively, of holes made at higher rates, but not according to the currently disclosed methods.
Figure 5:
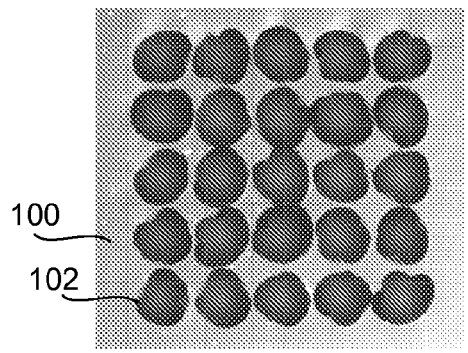
Figure 6:
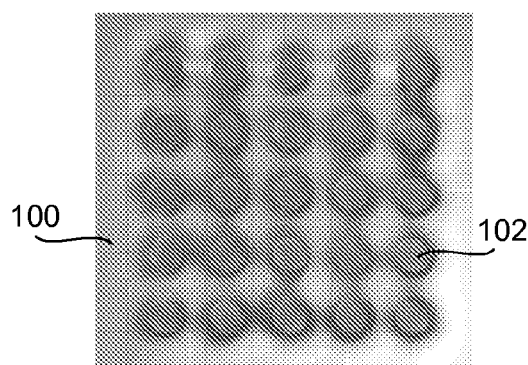

The present inventors found that increasing the laser repetition rate and resulting average power created damage tracks having a different appearance relative to holes formed at lower repetition rates. The holes thus created are surrounded with glass under tension. If such holes are etched normally as in the previously disclosed process, both the damage track and the areas of glass under tension are etched faster than the surrounding glass, resulting in over-etched holes with a generally conical shape, whereas the goal is, generally, to produce quasi-cylindrical holes. FIG. 4 shows a microscopic image of a glass sheet 100 at an angle, looking through the glass sheet 100 at the resulting holes 102 after etching following irradiation with the laser. FIGS. 5 and 6 show top and bottom views of the same holes 102. As seen in FIG. 5, the tops of the holes 102 or are not very round, are irregular in both size and shape, and are quite large relative to their pitch, which is 200 micrometers in the example shown. As seen in FIG. 6, the bottom or exit side of the holes 102 are also irregular in shape, though smaller, and vary both in shape and in position.

Figure 7:
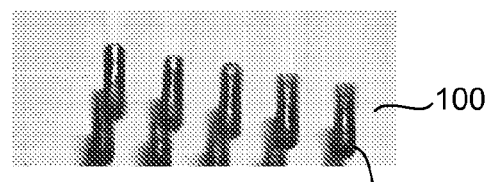
FIGS. 7, 8 and 9 are digital photographs of perspective, front side, and exit side views respectively, of holes made at higher rates and according to the currently disclosed methods, showing significant improvement in hole quality relative to the comparative example of FIGS. 4, 5 and 6.
Figure 8:
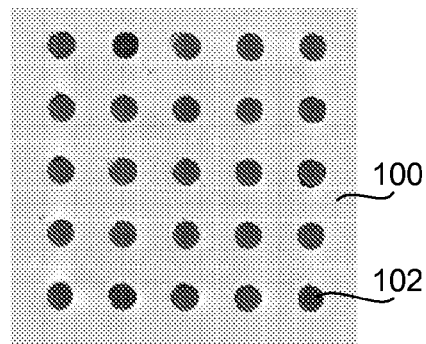

Tests have also shown that annealing can relieve the thermally induced stress and its effects on the etching process. When a thermal annealing step is employed following laser irradiation, the resulting etched holes become cylindrical as shown in the digital microscopic image of FIG. 7, showing a glass sheet 100 at an angle, looking through the glass sheet 100 at the resulting holes 102 after etching following irradiation with the laser. As seen in FIG. 8, and images of the top surface of the sheet 100 of FIG. 7, and FIG. 9, an image of the bottom or back surface of the same sheet 100, the holes 102 are much rounder (and more regularly positioned) than in FIGS. 4-6.

Figure 9:
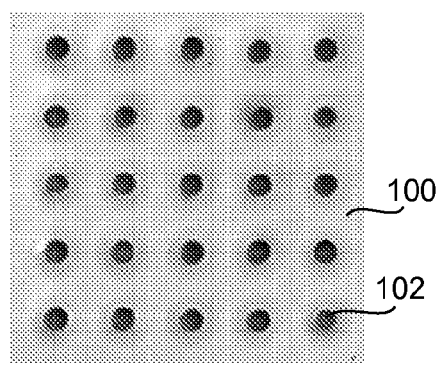

The regular positioning shown in FIGS. 8 and 9 was not achieved by post-irradiation annealing alone, however. Post-irradiation annealing also causes glass compaction, which leads to displacement of the holes 102, such that the spacing and pitch of the hole array is not sufficiently well controlled (not shown). The present inventors have dealt with this problem, and produced the highly regular arrays of FIGS. 8 and 9, by means of the process flow shown diagrammatically in FIG. 1.

Figure 1:
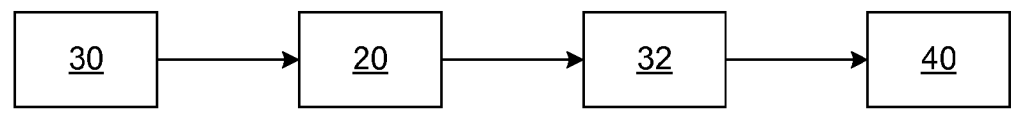
FIG. 1 is a flow diagram representing basic steps of a presently preferred method of the present disclosure.

As diagrammed in FIG. 1, the process optionally but preferably starts with a first glass annealing step 30 before a laser irradiation step 20. This annealing step 30 before irradiating may be omitted if position and/or pitch control is not critical, but for many applications positional accuracy over a large sheet of glass is key. The annealing 30 before irradiating is preferably for an extended period of time, at least for a time sufficient to compact the glass piece or sheet at issue sufficiently such that a post-laser-irradiation anneal step 32 does not cause any significant amount of further compaction. After poster-irradiation anneal step 32, an etch step 40 is use perform final shaping and sizing of the holes.

Figure 10:
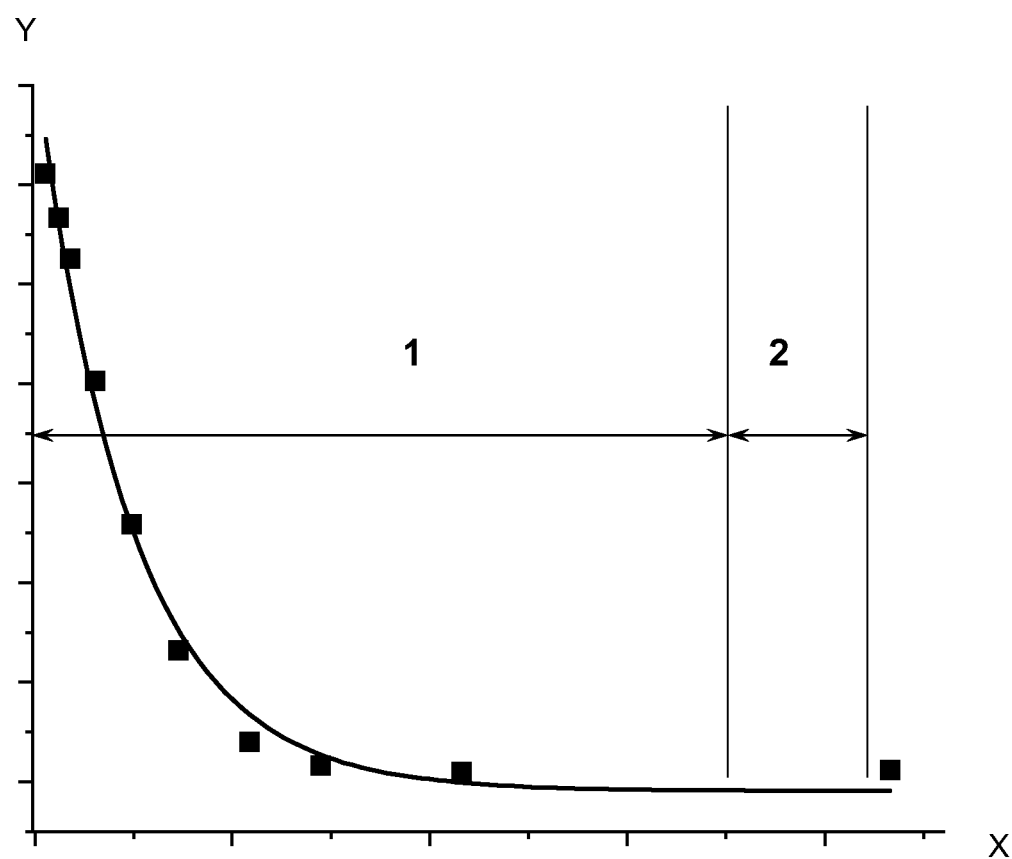
FIG. 10 is a plot of showing typical compaction dynamics for glass.

In specific experiments by the inventors, samples of EagleXG® glass were pre-annealed (step 30) for 12 hrs, at 700 C (EagleXG® glass typical annealing temperature is 722 C). This somewhat long annealing cycle allows for almost complete compaction of the glass. Typical compaction dynamics for glass is shown in the plot of FIG. 10, for a given temperature, with compaction on the Y axis and time at temperature on the X axis. Beyond a certain length 1 of annealing time, additional length 2 of heat-treatment time at the same temperature does not lead to significant changes in glass dimensions. Using lower annealing temperatures may require longer time and may be insufficient (when the same temperature is used in post-irradiation anneal step 32) to remove laser-induced stress. Higher annealing temperatures result in higher total compaction and potentially in larger over-all hole placement errors.

Figure 2:
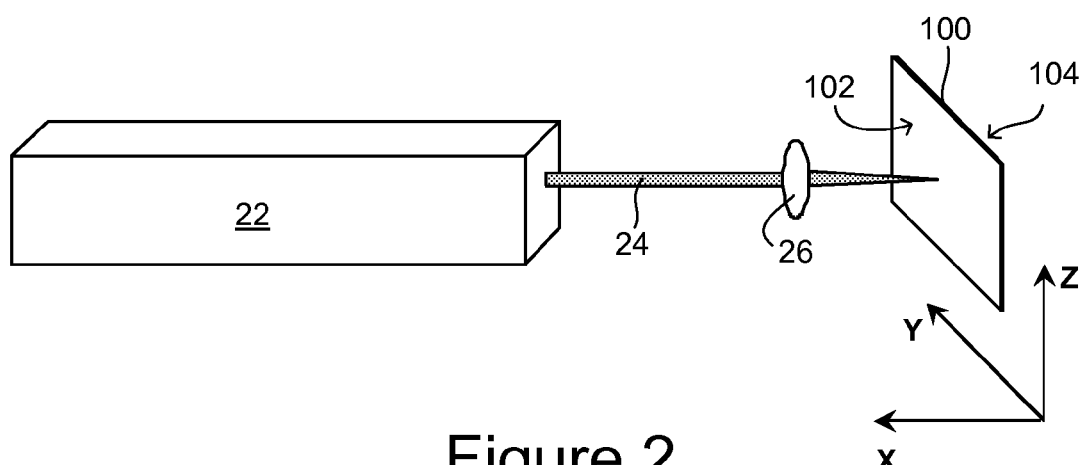
FIG. 2 is a diagrammatic perspective view of a laser irradiation apparatus useful in the methods disclosed herein.

Laser irradiation step 20 of FIG. 1 may be carried out within an optical system setup such as that shown in FIG. 2. The irradiating beam is a laser beam 24 desirably having a wavelength in the range of from 300 to 400 nm, desirably with a pulse length of one nanosecond or greater, more desirably in the range of from 5 to 60 nanoseconds. A Nd:KGW (Neodymium doped Potassium-Gadolinium Tungstate) or other Nd-doped laser 22 operated at 355 µm wavelength is one preferred laser type. The laser 22 is preferably operated at frequency in the range of from 80 to 150 kHz, more preferably in the range of from 100 to 120 kHz.

The front surface 102 of a glass sheet 100 is irradiated with a number of pulses commensurate with the depth of hole desired, with the hole being formed in the glass sheet 100 at a rate in the range of 0.60 to 3 micrometers per pulse. For through-holes, the number of pulses should be sufficient for the hole to just reach the back surface 104 of the glass sheet 100. For glass of from about 0.3 to about 0.6 mm thickness, for example, a desirable range for the number of pulses is from 700 to 1500, more desirably from 900 to 1300.

The glass sheet 100 desirably may placed on a motorized XYZ stage as shown in FIG. 2, which has the accuracy and the repeatability equal or better than 1 um. The laser beam 24 is desirably focused with a lens 26 or other optical system onto the front surface 102 of the glass 100. The numerical aperture of the lens 26 or optical system should ideally be more than approximately NA=0.1, desirably with the range of from 0.1 to 0.3. The beam should ideally be focused within plus or minus 100 micrometers of the front surface 102 of the glass sheet 100.

As an alternative applicable to all variations of the presently disclosed method, beam-shaping may also be used, if desired, as a means to change the hole shape. Elliptical holes have been produce by irradiating with an elliptical beam.

As a further generally applicable alternative, reducing the exposure duration enables making blind holes in addition to the through-holes described above, including both hole types on the same substrate, if desired. Blind holes will develop if, for example, the laser burst duration is reduced from 90 ms to approximately 10-20 ms. The resulting damage is similar with respect to the 7-10 um micro-channel described above, starting at the front surface of the glass and extending to some length inside the glass, which is a function of the ratio between the shortened duration and the full duration. Etching of such a track will produce a blind hole. A combination of through and blind holes of different depths within the same hole array may be created.

As yet another generally applicable alternative, angled holes may be formed. If the laser beam is directed onto the glass sample at an angle, the hole and damage created by the beam and the resulting etched hole will be also oriented at angle to the surface. The configuration of the laser setup may also be designed in such a way that it will allow for making an array which has both holes perpendicular to the glass surface and the angled ones, if desired.

After irradiation in step 20, the glass sheet 100 is processed in a post-irradiation annealing 32. This after-irradiating annealing 32 should be of sufficient duration to significantly reduce or eliminate the thermally induced residual stress, caused by the irradiating step 20, within the glass sheet 100 around the holes. Where the pre-irradiating annealing step 30 is used, the annealing step 32 should be performed at the same temperature, within plus or minus 10% as the annealing step 30.

Figure 3:
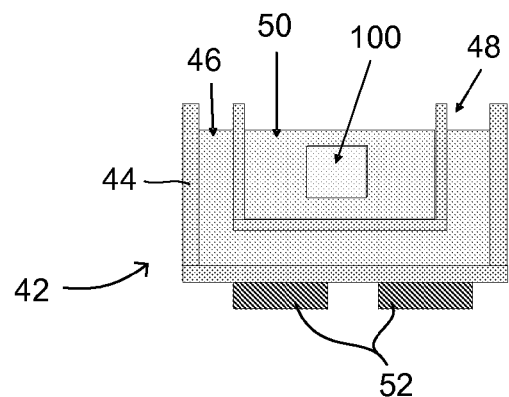
FIG. 3 is a diagrammatic cross section of an acid etching apparatus useful in the methods disclosed herein.

After the annealing step 32, the glass sheet 100 is then etched in an etching step 40, which is desirably an acid etch. FIG. 3 is a schematic representation of acid etch bench 42 useful in the etching step 40. In FIG. 3, the bench 42 includes an outer tub 44 with a sonic energy transmission fluid 46, such as water, held therein. An acid tub 48 is supported with the fluid 46, and an acid or acid blend 50 is contained therein. The irradiated and annealed glass sheet 100 is submerged in the acid or acid blend 50. Sonic energy is applied by energy transducers 52 to the outer tub 44 and is transmitted through the intervening tubs and fluids to the glass sheet 100 during the etching process. The acid used is desirably an acid blend, preferably an $HF+HNO_3$ solution. One desirable concentration is a 20% $HF+10\%$ $HNO_3$ solution.

The acid etch may be performed rather quickly, such as by a 10-min. etch in the ultrasonic etching bath shown in FIG. 3. This etch duration results in holes 80-85 um in diameter having good cylindrical shape. Placement accuracy of the etched holes was measured on a 100 mm sample, and the errors were within a 5-8 micrometer limit. Without the second annealing the errors would be on the order of 100 micrometers, when measured over the full extent of the 100 mm sheet.

Although annealing cycles may be relative long, many sheets can be annealed simultaneously in a furnace, making the process highly parallel and preventing it from adding much cost to the total process.

As an additional generally applicable alternative, an acid-resistant film/coating to the glass surfaces may improve the hole shape. This coating may perform several functions: (a) protect the surface from the laser-ablated debris; (b) mitigate mechanical damage to the surface of the glass surrounding the exposed area; (c) prevent glass thinning during etching thus improving the hole aspect ratio. Such coating/film may be removable or it may be left on the glass if it does not prevent or negatively impact further processing or use of the glass.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of fabricating a high-density array of holes in glass, the method comprising:

irradiating a glass sheet having a front surface with a laser beam so as to produce open holes extending into the glass sheet from the front surface of the glass sheet, the beam creating thermally induced residual stress within the glass around the holes;

annealing the glass sheet, after irradiating, to eliminate or reduce thermal stress caused by the step of irradiating;

etching the annealed glass sheet.

2. The method of claim 1 wherein the beam used in the step of irradiating the glass sheet is focused by a lens within +/−100 um of the front surface of the glass sheet, the lens having a numerical aperture in the range of from 0.1 to 0.3.

3. The method according to claim 1 wherein the beam used in the step of irradiating is a UV laser beam producing radiation having a wavelength in the range of from 300 to 400 nm.

4. The method according to claim 1, further comprising the step of compacting the glass sheet, before irradiating, by annealing the glass sheet.

5. The method according to claim 4 wherein the step of compacting comprises annealing at sufficiently high temperature for a sufficient time to render the glass sheet dimensionally stable during the step of annealing after irradiating.

6. The method according to claim 1, wherein the laser beam used in the step of irradiating is a pulsed laser, with pulse length of one nanosecond or greater.

7. The method according to claim 1, wherein the laser beam used in the step of irradiating is a pulsed laser, with pulse length in the range of 5 to 60 nanoseconds.

8. The method according to claim 1, wherein the laser beam used in the step of irradiating is a pulsed laser, with pulse repetition rate in the range of 80 to 150 kHz.

9. The method according to claim 1, wherein the laser beam used in the step of irradiating is a pulsed laser, with pulse repetition rate in the range of 100 to 120 kHz.

10. The method according to claim 1, wherein the laser beam used in the step of irradiating is a pulsed laser, and wherein the step of irradiating further comprises forming a hole in the glass sheet at a rate in the range of 0.060 to 3 micrometers per pulse.

11. The method according to claim 1, wherein the laser beam used in the step of irradiating is a pulsed laser, and wherein the step of irradiating further comprises irradiating the glass sheet at the position of a single hole with a number of pulses of the laser in the range from 700 to 1500.

12. The method according to claim 1, wherein the laser beam used in the step of irradiating is a pulsed laser, and wherein the step of irradiating further comprises irradiating the glass sheet at the position of a single hole with a number of pulses of the laser in the range from 900 to 1300.

13. The method according to claim 1 wherein the step of etching the glass sheet further comprises etching the glass sheet in an acid or acid blend.

14. The method according to claim 13 wherein the step of etching the glass sheet with acid further comprises etching the glass sheet in an $HF+HNO3$ solution.

15. The method according to claim 14 wherein the step of etching further comprises etching in solution of 20% $HF+10\%$ $HNO3$.

* * * * *